March 10, 1959

M. M. BROWN 2,876,714

CUTTER FOR COMPLEMENTARY COOKIE COMPONENTS

Filed Feb. 2, 1955

*INVENTOR.*
MEYER M. BROWN
BY *Hare and Nydick*

ATTORNEY

March 10, 1959  M. M. BROWN  2,876,714
CUTTER FOR COMPLEMENTARY COOKIE COMPONENTS
Filed Feb. 2, 1955  2 Sheets-Sheet 2

INVENTOR.
MEYER M. BROWN
BY
*Harry and Nydick*
ATTORNEY

2,876,714
CUTTER FOR COMPLEMENTARY COOKIE COMPONENTS

Meyer M. Brown, New York, N. Y.

Application February 2, 1955, Serial No. 485,651

6 Claims. (Cl. 107—47)

The present invention relates to a method of producing shaped cookies and related edible goods and to cutting devices for carrying out the method of the invention.

It is known to give cookies and similar edible goods a variety of shapes by forming the outline of pieces of dough either by hand or by means of so-called cookie cutters, the peripheral outline of which corresponds to the desired shape of the cookie such as an animal.

All cookie shapes as heretofore known are essentially two-dimensional—disregarding the third dimension represented by the thickness of the cookie—and hence limited to simulating an animal or other figure by roughly duplicating its outline.

One object of the present invention is to provide a novel and improved method of producing a variety of three-dimensional figures from cookies by combining several cookies of essentially two-dimensional shape.

Another object of the invention is to provide a novel and improved method of creating a three-dimensional figure such as an animal figure by combining several cookies, each of which has the shape of a component part of the figure to be created.

Still another object of the invention is to provide a novel and improved method of producing several cookies each having the shape of a component part of a three-dimensional figure and of fitting the finished cookies together with a coherence sufficient to retain the cookies in the required relative position and to stand up the three dimensional figure created from the cookies.

A further object of the invention is to provide a set of novel and improved cookie cutters shaped to cut flat cookie dough in form of component parts of a three-dimensional figure and adapted to be joined to each other after baking to form said three-dimensional figure with a sufficient coherence to stand up the figure and to displace the same as a unit on a base within reasonable limits.

A still further object of the invention is to provide a set of novel and improved cookie cutters shaped to cut flat dough pieces in form of complementary parts adapted to be releasably joined to each other after baking, to form a selected one of several three-dimensional figures, certain of said cut-out and baked dough pieces being shaped to form component parts of different three-dimensional figures.

A still further object of the invention is to provide a set of novel and improved cookie cutters each of which is formed to cut in the respective pieces of dough a slot or slots, said slots permitting to join the cookies in form of a three-dimensional figure capable of standing up by interlocking engagement of the cookies at said slots.

A more specific object of the invention, allied with the preceding one, is to provide a set of novel and improved cookie cutters, the slot cutting wall portions of which are shaped to compensate for the expansion and other deformation which the dough undergoes or may undergo during the baking. This affords the advantage that the cookies can be conveniently interlocked for the purpose aforesaid even though they may have become somewhat deformed during baking.

A still further object of the invention is to provide a novel and improved cookie cutter as previously described, which includes means controlling the thickness of the dough, especially adjacent to the slotted dough parts to assure a substantially uniform thickness of the dough along the margins of the dough defining said slots. Such uniform thickness adjacent to the slots is essential to permit interengagement of the cookies without danger of breaking the cookies when the same are fitted together.

The method and the cookie cutters according to the invention permit the formation of cookies in form of component parts of a variety of three-dimensional figures and the joining of the cookies to create a selected one of several three-dimensional figures by a housewife or even a child without requiring special skill and experience.

Three-dimensional cookie figures according to the invention which are capable of standing up and to be moved around within reasonable limits offer a much more attractive and amusing appearance than conventional generally flat or two-dimensional cookies, especially to children.

Other and further objects, features and advantages of the invention will be pointed out hereinafter and set forth in the appended claims forming part of the application.

In the accompanying drawing several preferred embodiments of the invention are shown by way of illustration.

Each of the three exemplified three-dimensional figures is composed of several cookies. The exemplified three dimensional figures are all animal figures. However, the principle of the invention is not limited to the creation of animal figures but a variety of other designs may be created by giving the cookie cutters appropriate outlines.

When producing animal figures, it has been found advantageous to give one of the cookies the shape of the main portion of the animal, that is, the shape of the trunk and the head of the animal and to form the legs, ears, etc. of the animal by fitting additional cookies to the cookie forming the main portion.

It has further been found advantageous to shape the cookies serving as complementary parts so that they are suitable for combination with different main portions. This permits the creation of a variety of three-dimensional figures by means of a comparatively small number of cookie cutters.

Figure 7:
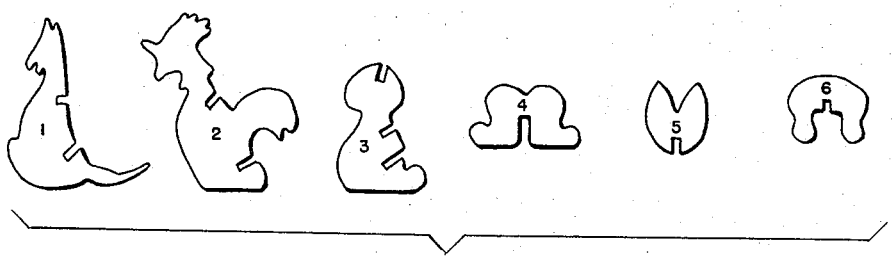
Fig. 7 shows the basic outline of several cookie cutters of the kind shown more in detail in Figs. 1 through 5.

Accordingly, Fig. 7 shows three main or base portions, to wit, the general outline of a kangaroo, a rooster and a bunny and three complementary portions. For purpose of identification, the main or base portions are designated by reference numerals 1, 2 and 3 and the complementary portions by reference numerals 4, 5 and 6. The corresponding cookies are designated in Fig. 8 by the same reference numerals.

Figure 8:
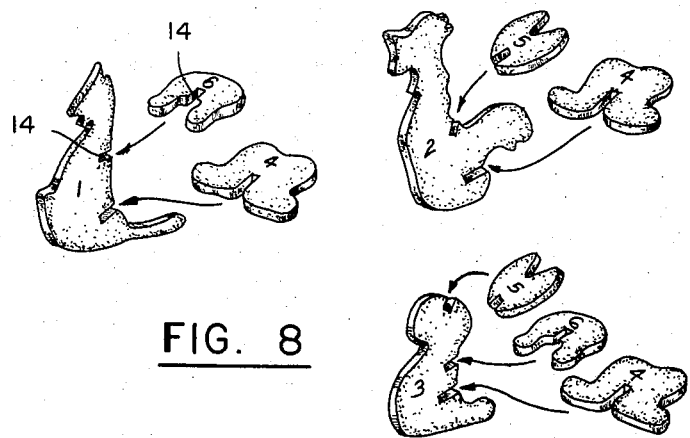
Fig. 8 shows the cooperation of cookies formed by cookie cutters according to Fig. 7 to form three different three-dimensional figures.
Figure 9:
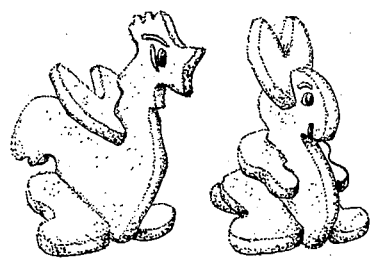
Fig. 9 is a perspective view of three set-up figures, to wit, a rooster, a bunny and a kangaroo formed from the cookies of Fig. 8.

As can be seen in Figs. 8 and 9, cookies 4 and 6 when combined with cookie 1 form the front and hind legs respectively of the kangaroo and when combined with cookie 3 the front and hind legs respectively of the bunny. Cookie 5 when combined with cookie 2 forms the wings of the rooster and when combined with cookie 3 the ears of the bunny.

As appears from the previous description, the component parts of the figures are fitted together after the cookie dough is baked. Accordingly, there is no inherent adhesion between the cookies forming the component parts as there would be between the component parts in the dough stage.

According to the invention, the cookies are joined to each other by providing in each cookie at least one slot which cooperates with a slot in another cookie so that the two cookies can engage each other in the manner shown in Fig. 9. As will be noted, each of the two coacting slots is deep enough to permit the respective cookie portions to overlie each other.

Referring now to Figs. 1 through 4, the arrangement of cookie cutters suitable for the purpose of the invention will be described in detail in connection with these figures.

Each of the cookie cutters shown in these figures consists of a substantial rigid strip 10 made of comparatively thin sheet material and bent, molded or formed to circumscribe the configuration of the cookie to be formed. The strip may be made of metal or plastic, plastic being shown and generally preferred. One of the longitudinal edges of the strip constitutes the cutting edge 10'. The opposite longitudinal edge of the strip is preferably flanged at 12 to facilitate handling of the cutter and also to give better rigidity to the strip. If the cutter is comparatively large such as the cutter shown in Fig. 1 it may be further stiffened by one or several cross pieces 13.

Figure 1:
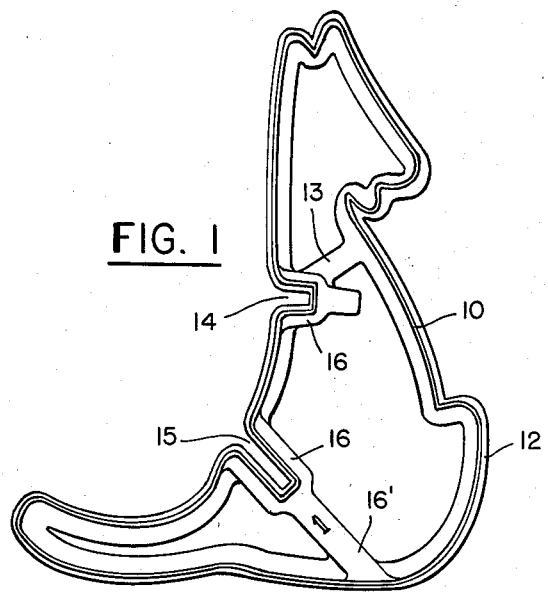
Figs. 1, 2 and 3 are views of three cookie cutters according to the invention, each constituting a component part of a three-dimensional figure, such as a kangaroo.
Figure 2:
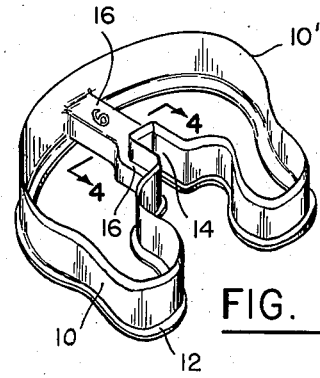
Figure 3:
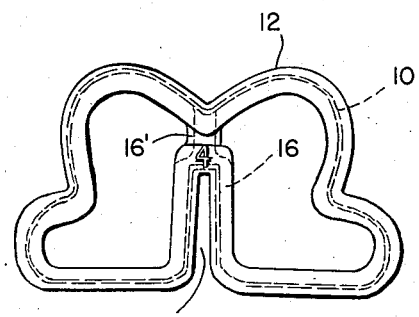
Figure 4:
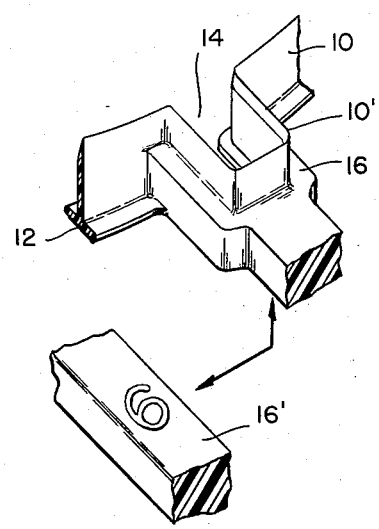
Fig. 4 is a section taken on line 4—4 of Fig. 2 on an enlarged scale.

The peripheral outlines defined by the cutters according to Figs. 1, 2 and 3 correspond to the outlines of the cutters 1, 4 and 6 respectively shown in Fig. 7 and accordingly the cutters of Figs. 1, 2 and 3 are correspondingly numbered.

The outline defined by the cutting edge of each of the cutters includes at least one inwardly extending slot or notch 14 defined by substantial parallel walls, the outline of Fig. 1 being shown as including a second slot 15.

Similarly, the cutters designated in Fig. 7 as cutters 2 and 3 have a second and a third slot respectively, the number of slots in a cutter being controlled by the shape of the component part to be formed by the cutter.

Cutters of the kind here described are used in a conventional manner by pressing the cutting edge against a layer of suitable dough. After cutting the dough, the excess dough surrounding the cutter is removed, for instance by hand and the aid of a knife blade. The cut-out piece of dough is baked in the conventional manner to finish the cookie.

The preparation of the dough and the ingredients thereof are not essential for the invention. Any dough which results in cookies of reasonable stiffness and strength is suitable for the purpose of the invention. In this connection it should also be mentioned that the terms "dough" and "cookie" as used herein are intended to encompass any edible material which lends itself to produce small shaped edible portions such as portions made of fudge, chocolate or candy.

As previously mentioned, the finished cookies are joined by interengagement of the cookies at the slots. Let it be assumed that for instance a cookie shaped by cutter 6 is to be fitted in the upper slot 14 of a cookie shaped by cutter 1. In other words, that it is desired to apply the front paws to the body of the kangaroo. As is apparent from Figs. 8 and 9, the portions of cookie 1 defining slot 14 overlie the respective portions of cookie 6 defining slot 14 and vice versa. The same applies to the engagement of any other two cookies.

To permit the aforedescribed interengagement of the slots and the respective cookie portions, the width of the slots and the thickness of the cookies must be correlated so that the width of each slot just fits the thickness of the matching cookie, at least at the cookie parts adjacent to the slots. In other words, the cookie should have a substantially uniform thickness slightly less than the width of the slots at least adjacent to the vicinity of the slots, taking in consideration the average rise of the dough during baking.

Figure 6:
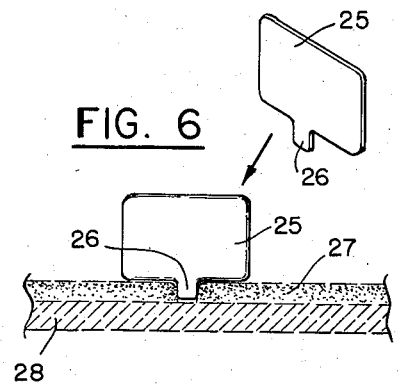
Fig. 6 is a gauge for gauging the thickness of the dough from which the cookies are baked.

Cookie dough, at least when prepared in the home, is usually rolled out in form of a layer by means of a rolling pin. To facilitate rolling of the dough to the required uniform thickness, applicant has provided a dough gauge. As shown in Fig. 6, this dough gauge comprises a grip 25 from which extends a preferably sharpened tongue 26 the length of which corresponds to the desired thickness of the dough which should be somewhat less than the width of the slots which are cut out by the cutters from the cookie dough to allow for the rising of the dough in the course of baking. The gauge is pressed into the dough 27. When the edge of its tongue 26 rests against the support 28 for the dough and the respective edge of grip 25 against the surface of the dough, the layer or sheet of dough has the suitable thickness.

While the thickness gauge just described facilitates the rolling out of the dough to a sheet of suitable thickness, it involves measuring operations on the part of the person preparing the dough which are not always convenient and reliable as the use of the gauge checks the thickness of the dough only at the probed point. To assure that the sheet of dough has the suitable thickness at least at the critical parts adjacent to the slots, applicant has provided limit means which automatically press the dough to the required thickness when the cookie cutter is applied to the dough. These limit means or dough control means are shown in the form of ledges 16 encompassing the portions of strip 10 defining the respective slots and extending from the strip. The vertical distance between the cutting edge 10' and the respective surface of the ledge is somewhat less than the width of the slot. As is apparent, the ledges will automatically reduce the respective part of the dough to the proper thickness when the cutter is applied to the dough for cutting out a piece of dough. The ledges may be attached to the strip but they are preferably integral therewith, particularly when the cutter is made of plastic formed in a mold. At least some of the ledges are preferably extended to form a cross piece similar to cross pieces 13 further stiffening the cutter. Fig. 1 shows such an extended ledge 16' associated with slot 15. Similarly, the ledges of Figs. 2 and 3 are intended to form reinforcing cross pieces 16'. The width of the ledges may be selected in accordance with the requirements of the shape of the specific cutter. It may constitute a complete bottom of the cutter, but generally it is preferable to provide a comparatively narrow ledge to facilitate cleaning of the cutter.

As appears from the previous description, the relation between the width of the slot and the thickness of the dough or rather of the finished cookie is a rather critical one. On one hand it must be possible to assemble two cookies together without applying too much pressure as cookies are generally rather brittle. On the other hand, the slots must fit each other fairly snugly to permit the assembled figure to retain its coherence and to stand properly.

The aforedescribed thickness limit or regulating means assure that the cookie dough has the proper thickness at the critical areas. However, the operations here involved are, technically speaking, rather crude ones. The cookie dough may be somewhat deformed when the cutter is withdrawn or the cookies are greased. Experience also shows that sometimes the cookie dough spreads somewhat during the baking operation resulting in a narrowing of the slot.

To compensate for such narrowing of the slots or other variations which may make difficult the mating of two cookies, applicant has provided a cookie cutter with a slot the general width of which is somewhat wider than the thickness of the dough as controlled by the limit means but which is narrowed at several points. The result is that the slot or notch formed in the dough and hence in the cookies has several small slight protuberances extending into the slot. These protuberances are so thin and weak that when the thickness of the mating cookie is such that it will fill substantially the full width of the slot, they will be sheared off when the mating cookie is pushed into the slot. On the other hand, if the thickness of the mating cookie is such that it corresponds to the width of the slot as defined by the protuberances, the protuberances will remain when a mating cookie is pushed in the slot and retain the said cookie sufficiently tight for the purpose. As a result, the two cookies will automatically adjust themselves to a snug fit without breaking of the cookies or falling apart.

Figure 5:
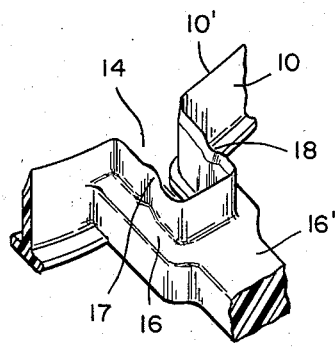
Fig. 5 is a section similar to Fig. 4 but showing a modification of the slot forming part of the cutter.

Fig. 5 shows cookie adjustment means as just described. These adjustment means are shown as transverse grooves 17 and 18 partially narrowing the general width of the slot. As is apparent, these grooves produce corresponding ribs in the slot of the finished cookie. While only one groove has been shown on each side of the slot several grooves may be provided or grooves on one side of the slot only.

The combination of the three-dimensional figures shown in Fig. 9 from the various cookie forms shown in Fig. 8 is self-evident. It will further be apparent that the invention is not limited to the figures here illustrated. A great variety of figures can be composed by applying the principle of the invention. Furthermore, the term "three-dimensional" as used herein is intended to include any kind of figures which can be composed of cookies, including figures of imaginary animals, human figures, plant figures, geometrical designs, building structures, etc.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A cookie cutter for cutting a piece of dough of predetermined shape from a layer of dough comprising, in combination, a substantially rigid continuous strip defining a closed peripheral outline substantially identical to said predetermined shape, one longitudinal side of said strip defining a cutting edge lying in a substantially single plane, said strip having portions defining an inwardly extending slot forming a part of said outline, and limit means within said outline adjacent to said portions of said strip defining said slot and spaced from said plane of said cutting edge for limiting the thickness of the layer of dough cut by said strip portion to the vertical distance between said plane of said cutting edge and said limit means, said vertical distance being slightly less than the width of said slot, and said limit means including a ledge extending inwardly from the periphery of said strip and encompassing said slot defining portions of said strip to reduce the thickness of dough in excess of said vertical distance to said distance.

2. A cookie cutter according to claim 1, wherein the strip portion defining said slot includes parts at which the free width of the slot is reduced to form corresponding protrusions in the respective outline portion of the cut piece of dough.

3. A cookie cutter according to claim 1, wherein the strip portion defining said slot further includes protuberances protruding into said slot to reduce the free width thereof at said protuberances.

4. A cookie cutter according to claim 3, wherein said protuberances are in form of inwardly facing transverse grooves in the strip portion defining the side walls of the slot.

5. An article of manufacture comprising, in combination, a set of cookie cutters for cutting a plurality of separate pieces of dough from a single layer of cookie dough in which such separate pieces of dough define outlines complementing each other to form a three dimensional figure of predetermined shape, each of said cookie cutters having a cutting edge circumscribing the outline of a component part of said figure and including an edge portion defining an inwardly protruding slot, said slots being correlated to effect slots in cookies baked from cut pieces of dough for joining said cut pieces to form said three dimensional figure, each of the cutters in said set comprising thickness control means disposed within the outline of the respective cutter limiting the thickness of the dough cut by each cutter at least adjacent to the slot defining portions of the cutting edge to a thickness slightly less than the width of said slot of a meeting piece of dough.

6. A set of cookie cutters according to claim 5, wherein the portion of the cutting edge of each cutter in the set defining said slot includes parts at which the free width of the slot is reduced to form corresponding protrusions in the respective outline portion of the cut dough pieces.

References Cited in the file of this patent

UNITED STATES PATENTS

| Number | Name | Date |
|---|---|---|
| D. 154,311 | Price | June 28, 1949 |
| 202,944 | Holmes | Apr. 30, 1878 |
| 388,904 | Nash | Sept. 4, 1888 |
| 996,024 | Meier | June 20, 1911 |
| 1,182,055 | Thom | May 9, 1916 |
| 1,414,022 | Huston | Apr. 25, 1922 |
| 1,446,513 | Morris | Feb. 27, 1923 |
| 1,999,314 | Anderson | Apr. 30, 1935 |
| 2,119,260 | Valle | May 31, 1938 |
| 2,338,738 | Rebholz | Jan. 11, 1944 |
| 2,596,159 | McBirney | May 13, 1952 |
| 2,612,123 | Nord | Sept. 30, 1952 |
| 2,694,987 | Kappler | Nov. 23, 1954 |
| 2,775,523 | Green | Dec. 25, 1956 |